US012583426B2

(12) United States Patent
Schlimme et al.

(10) Patent No.: US 12,583,426 B2
(45) Date of Patent: Mar. 24, 2026

(54) BRAKING SYSTEM, METHOD OF OPERATING A BRAKING SYSTEM AND TRANSPORTATION VEHICLE WITH A BRAKING SYSTEM

(71) Applicant: VOLKSWAGEN AKTIENGESELLSCHAFT, Wolfsburg (DE)

(72) Inventors: Hauke Christian Schlimme, Braunschweig (DE); Arne Bartels, Wolfsburg (DE); Frank Bärecke, Wolfsburg (DE); Christian Alstadt, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 467 days.

(21) Appl. No.: 18/064,753

(22) Filed: Dec. 12, 2022

(65) Prior Publication Data

US 2023/0182704 A1    Jun. 15, 2023

(30) Foreign Application Priority Data

Dec. 13, 2021    (DE) ..................... 10 2021 214 270.2

(51) Int. Cl.
| | |
|---|---|
| *B60T 13/68* | (2006.01) |
| *B60T 8/88* | (2006.01) |
| *B60T 13/38* | (2006.01) |
| *B60T 15/04* | (2006.01) |
| *B60T 17/22* | (2006.01) |

(52) U.S. Cl.
CPC ............ *B60T 13/385* (2013.01); *B60T 8/885* (2013.01); *B60T 13/68* (2013.01); *B60T 15/041* (2013.01); *B60T 17/221* (2013.01)

(58) Field of Classification Search
CPC ..................................................... B60T 13/382
See application file for complete search history.

(56) References Cited

U.S. PATENT DOCUMENTS

| | | |
|---|---|---|
| 6,471,304 B1 | 10/2002 | Deml et al. |
| 10,207,694 B2 | 2/2019 | Minato et al. |

(Continued)

FOREIGN PATENT DOCUMENTS

| | | | |
|---|---|---|---|
| CN | 102616145 B | * | 11/2013 |
| CN | 206797104 U | * | 12/2017 |

(Continued)

*Primary Examiner* — Melody M Burch
(74) *Attorney, Agent, or Firm* — BARNES & THORNBURG LLP

(57) ABSTRACT

A brake system for a transportation vehicle having a brake device for braking a wheel of the transportation vehicle, an actuator device for targetedly actuating the brake device, a control device for controlling the actuator device, and an emergency brake device for braking the wheel in response to a malfunction of the transportation vehicle. The emergency brake device has an energy store for storing energy for actuating the brake device and a triggering device for releasing the stored energy in the energy store to actuate the brake device, the triggering device releases the energy store in response to a failure of an on-board electrical system of the transportation vehicle. Also disclosed is a method for operating a brake system and to a transportation vehicle having such a brake system.

18 Claims, 4 Drawing Sheets

(56)        References Cited

U.S. PATENT DOCUMENTS

| | | | |
|---|---|---|---|
| 11,433,866 | B2 | 9/2022 | Hecker et al. |
| 2005/0029864 | A1 | 2/2005 | Bauer et al. |
| 2010/0025141 | A1 | 2/2010 | Bensch et al. |
| 2020/0189550 | A1 | 6/2020 | van Thiel |
| 2020/0198609 | A1 | 6/2020 | Nemeth et al. |

FOREIGN PATENT DOCUMENTS

| | | | | |
|---|---|---|---|---|
| DE | 102007052439 | A1 | 5/2009 | |
| DE | 102015201236 | A1 | 7/2016 | |
| DE | 102017120691 | A1 * | 3/2019 | .............. B60T 13/26 |
| DE | 102017222625 | A1 | 6/2019 | |
| DE | 102018217615 | A1 | 4/2020 | |
| DE | 102018222149 | A1 | 6/2020 | |
| DE | 102018222179 | A1 | 6/2020 | |
| DE | 102019206501 | A1 | 11/2020 | |
| DE | 102020102716 | A1 | 8/2021 | |
| EP | 2241486 | A1 | 10/2010 | |
| EP | 2982555 | A1 * | 2/2016 | .............. B60T 13/14 |
| ES | 2297403 | T3 * | 5/2008 | ......... G01R 31/3647 |
| WO | WO-2018131621 | A1 * | 7/2018 | ........... B60T 13/261 |
| WO | 2019158351 | A1 | 8/2019 | |

* cited by examiner

BRAKING SYSTEM, METHOD OF OPERATING A BRAKING SYSTEM AND TRANSPORTATION VEHICLE WITH A BRAKING SYSTEM

PRIORITY CLAIM

This patent application claims priority to German Patent Application No. 10 2021 214 270.2, filed 13 Dec. 2021, the disclosure of which is incorporated herein by reference in its entirety.

SUMMARY

Illustrative embodiments relate to a brake system, in s, a so-called "brake-by-wire" brake system, for a transportation vehicle comprising a brake device for braking a wheel of the transportation vehicle, an actuator device for targetedly actuating the brake device, a control device for controlling the actuator device, and an emergency brake device for braking the wheel in the event of a malfunction of the transportation vehicle. Illustrative embodiments further relate to a method for operating the disclosed brake system and to a transportation vehicle having the disclosed brake system.

BRIEF DESCRIPTION OF THE DRAWINGS

Disclosed embodiments will be discussed in more detail below with reference to the drawings, in which.

DETAILED DESCRIPTION

Figure 1:
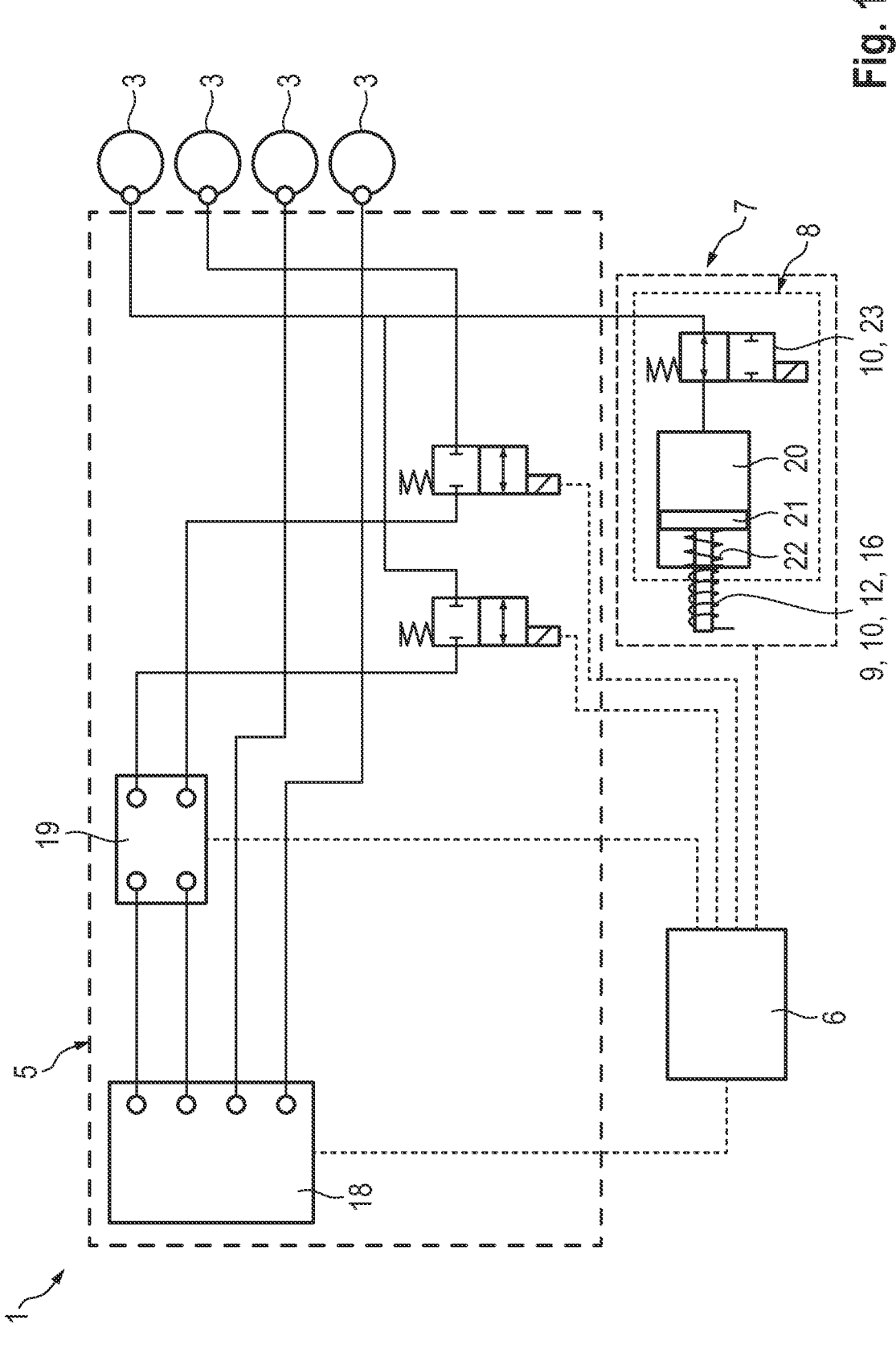
FIG. 1 is a schematic diagram of a first exemplary embodiment of a disclosed brake system.

Conventional transportation vehicles basically have two types of brake systems. There are brake systems designed for use during travel for the purposes of braking the rolling transportation vehicle or for brief stoppages, for example, at traffic signals. Such brake systems will hereinafter be referred to for simplicity as brake systems. There are also immobilizing brake systems for holding the stationary transportation vehicle in a parked position. Immobilizing brake systems are in principle not particularly well suited to braking a rolling transportation vehicle. Such brake systems will hereinafter always be referred to as immobilizing brake systems.

In conventional brake systems, a braking input, imparted, for example, using a brake pedal, can be transmitted mechanically, in particular, hydraulically, to a brake device, for example, a disk brake with a brake disk, a brake caliper and brake pads, for the purposes of braking a wheel of the transportation vehicle. In the event of a failure of an on-board electrical system of the transportation vehicle, braking of the wheel by actuation of the brake device remains possible, at least with a reduced braking action.

Modern brake-by-wire brake systems have a brake device that can be actuated by an electrically operable actuator device. A braking input can be transmitted electrically by a control device of the brake system to the actuator device. The electrical energy required for this purpose can be provided by the on-board electrical system of the transportation vehicle. A drawback of these brake systems is that, in the event of a failure of the on-board electrical system, active braking of the transportation vehicle by the brake device is no longer possible. Such a scenario poses a particular risk to the occupants of the transportation vehicle and to other traffic participants and infrastructure in the surroundings of the transportation vehicle.

Furthermore, a large number of immobilizing brake systems for transportation vehicles are known. Document U.S. Pat. No. 10,207,694 B2 discloses a pneumatically actuatable immobilizing brake system. By using an electrical signal, an actuator can be caused to actuate an immobilizing brake using compressed air. In the event of a failure of the on-board electrical system, the electrical signal for activating the immobilizing brake can no longer be transmitted. Document WO 2019/158 351 A1 presents an electropneumatic immobilizing brake that has a redundant electrical supply such that, in the event of failure of an electrical source, a further electrical source remains available for operating the immobilizing brake. In the event of a total failure of the on-board electrical system, the immobilizing brake cannot be activated. Document US 2020/0 189 550 A1 has disclosed an electropneumatic immobilizing brake system which has a spring device for the purposes of actuating the immobilizing brake and has a compressed air system, which can be actuated by a control device, for the purposes of releasing the immobilizing brake. In the event of failure of a main brake system, the immobilizing brake system can be used as an emergency brake system. A functioning on-board electrical system is required for this purpose.

Known brake-by-wire brake systems and immobilizing brake systems have the shortcoming that, for the purposes of activation, recourse must always be made to the on-board electrical system of the transportation vehicle, because electrical energy is required for the transmission of the control command. Immobilization of the wheels of the transportation vehicle is thus not possible in the event of a failure of the on-board electrical system. Even if an activation were possible, a braking torque that can be provided during an emergency braking operation cannot be provided in a targeted way, with the result that the risk of overly intense braking, and of an associated loss of control over the steering of the transportation vehicle, is significantly increased.

Disclosed embodiments eliminate or at least partially eliminate the above-described drawbacks in a brake system for a transportation vehicle. In particular, it disclosed embodiments create a brake system for a transportation vehicle, a method for operating a brake system, and a transportation vehicle, which in a simple and inexpensive way ensure reliable braking of the rolling transportation vehicle in the event of a failure of the on-board electrical system.

Disclosed embodiments provide a brake system for a transportation vehicle, a method for operating a brake system, and a transportation vehicle. Here, features and details that have been described in conjunction with the disclosed brake system self-evidently also apply in conjunction with the disclosed method and the disclosed transportation vehicle and vice versa in each case, such that, with regard to the disclosure, reference is and always can be made reciprocally between the individual properties of the disclosed embodiments.

According to a first exemplary embodiment, this is achieved by a brake system for a transportation vehicle. The brake system has a brake device for braking a wheel of the transportation vehicle, an actuator device for targetedly actuating the brake device, a control device for controlling the actuator device, and an emergency brake device for braking the wheel in the event of a malfunction of the transportation vehicle. According to the disclosed embodiments, the emergency brake device has an energy store for storing energy for actuating the brake device and has a triggering device for releasing the stored energy in the energy store for the purposes of actuating the brake device, the triggering device being designed to release the energy store in the event of a failure of an on-board electrical system of the transportation vehicle.

The brake device is designed to brake the wheel of the transportation vehicle. The brake system may have multiple generic brake devices. The brake system may have four brake devices which are each designed to brake a different wheel. The brake device may be designed as a disk brake and has a brake disk, which can be coupled rotationally conjointly to the wheel, and a brake caliper, which can be arranged on a bodyshell of the transportation vehicle and which has brake pad holders held movably relative to one another thereon, with brake pads being arranged on the brake pad holders. Alternatively, the brake device may also be designed as a drum brake with pivotable brake shoes, on which the brake pads may be arranged, or the like.

To provide a braking input, the brake system may have a braking input device, which may, for example, have a brake pedal. A braking input can thus be transmitted to the brake system by targeted actuation of the brake pedal by the driver of the transportation vehicle. A brake pedal may also be provided for a co-driver of the transportation vehicle. Additionally or alternatively, the braking input device is, for example, designed as an interface of a driver assistance system, for example, of a brake assistant or of an autonomous vehicle controller, to receive the braking input from the driver assistance system.

For the targeted actuation of the brake device, the brake system has the actuator device. According to the disclosed embodiments, the actuator device may, for example, be designed as an electropneumatic, electrohydraulic or electromechanical actuator device. By using the actuator device, a brake pressure can be generated in the brake device for the purposes of braking the wheel. Accordingly, the actuator device may be designed to implement the relative movement of the brake pad holders or of the brake shoes. A level of the brake pressure and thus of the braking torque that can be generated can be set in targeted way by the actuator device.

The control device is designed to control the actuator device in targeted way. For example, targeted electrical energization of the actuator device for the purposes of generating a pneumatic pressure, a hydraulic pressure or a mechanical pressure force, for example, by an electric motor, which may be coupled to a transmission, for example, a toothed-gear transmission, ball spindle mechanism or the like, for the purposes of implementing the relative movement of the brake pads, can be effected by the control device.

The emergency brake device is designed to brake the wheel in the event of a malfunction of the transportation vehicle. In the context of the disclosure, a malfunction is to be understood to mean a failure of the on-board electrical system as a whole, such that all of the electronic components are no longer operable. To ensure reliable braking in the event of such a malfunction, the emergency brake device has the energy store and the triggering device. The emergency brake device may be designed to brake the wheel in a sustained way. This means that the emergency brake device may be designed to implement, in interaction with the brake device, the function of an immobilizing brake after the transportation vehicle has come to a standstill.

The energy store is designed to temporarily store energy for the actuation of the brake device. A storage capacity of the energy store may be dimensioned such that the energy is sufficient to bring the transportation vehicle traveling at maximum speed reliably to a standstill. The brake system may have an energy exchange device for the purposes of adding energy into the energy store and for the purposes of discharging energy from the energy store. It is thus possible for a predefined energy level to be set in the energy store by the energy exchange device. According to the disclosed embodiments, the energy store may be designed as an electrical, pneumatic, hydraulic and/or mechanical energy store. For example, a capacitor may be as an electrical energy store. A pressure chamber may be as a pneumatic or hydraulic energy store. A spring device, for example, a helical spring, may be a mechanical energy store. The energy store may be designed to release the stored energy in targeted way. According to the disclosed embodiments, the energy store may also have a pressure chamber in which a spring-loaded pressure piston is guided for the purposes of varying a chamber volume of the pressure chamber. A targeted release may, for example, be understood to mean a linear, progressive, degressive or intermittent release of the energy. The energy store may be designed to be configurable for this purpose, such that the nature of the targeted release of the energy can, for example, be varied while the transportation vehicle is traveling. For example, an intermittent release of energy may be configured in the case of a snow-covered or wet roadway, a progressive release of energy may be configured in the presence of dense traffic to prevent a rear-end collision of a transportation vehicle traveling behind, or a degressive release of energy may be configured in the presence of a short distance before a corner.

The triggering device is designed to retain and to release the stored energy in the energy store. The stored energy can be released in such a way that the brake device can hereby be directly or indirectly actuated. Such a release may, for example, be performed in a way dependent on the braking input and/or a present deceleration of the transportation vehicle and/or a present speed of the transportation vehicle and/or a present gradient of the roadway. The triggering device is furthermore designed to automatically release the stored energy in the energy store, for the purposes of actuating the brake device, in the event of a failure of the on-board electrical system. The triggering device may be designed not to release the stored energy in the energy store, for the purposes of actuating the brake device, during normal operation of the on-board electrical system, at least while the transportation vehicle is traveling. The triggering device may, for example, have an electrical storage battery and an electric motor which are configured such that the electrical storage battery is charged, or can be charged by the on-board electrical system, when the on-board electrical system is functional. The electric motor may be designed as an actuating motor with a strong self-locking action, such that no inadvertent triggering is possible owing to vibrations or the like. The electric motor may be electrically deenergized in this state. If the on-board electrical system fails, the electrical storage battery is designed to automatically output electrical energy to the electric motor. In this way, the stored energy in the energy store can be released for the purposes of actuating the brake device.

A disclosed brake system has the benefit over conventional brake systems that reliable stoppage of the traveling transportation vehicle in the event of a failure of the on-board electrical system is ensured using simple methods or mechanisms and in an inexpensive way by use of the emergency brake device. This is achieved by way of the interaction of the energy store with the triggering device. The triggering device is designed to release the energy store automatically, and without the need for a supply of electrical energy from the on-board electrical system, in the event of failure of the on-board electrical system. The energy store provides the brake device with the energy that is required for braking the transportation vehicle. The operational reliability of the disclosed brake system is thus greatly increased in relation to conventional brake systems.

According to at least one disclosed embodiment, in the case of a brake system, provision may be made for the emergency brake device to have a configuration device for targetedly configuring the actuation, providable using the emergency brake device, of the brake device. The configuration device may, for example, be designed for increasing, in particular, for targetedly increasing, and for reducing, in particular, for targetedly reducing, the energy that is stored in the energy store. Alternatively or in addition, the configuration device may be designed for setting or limiting the maximum energy that can be released from the energy store and/or a rate of release of the energy that can be released from the energy store. The configuration device may be designed to configure the emergency braking device repeatedly, optionally at least once every five seconds, optionally at least once every second, or continuously, while the transportation vehicle is traveling. The configuration device may be designed to perform the configuration of the energy store on the basis of predefined parameters, the parameters may have relevance, in particular, special relevance, for a braking operation of the transportation vehicle. This has the benefit that, using simple methods and mechanisms and in an inexpensive way, it can be ensured that a braking torque that meets the present requirements can be generated by the emergency brake device in the event of a failure of the on-board electrical system.

According to the disclosed embodiments, it is suggested that the configuration device is designed to perform the configuration of the providable actuation in a way dependent on route data and/or weather data and/or traffic data and/or the vehicle speed and/or a driver profile of a driver of the transportation vehicle and/or a total weight of the transportation vehicle and/or a tire state of the transportation vehicle.

According to the disclosed embodiments, it is, for example, possible for data relating to ascending gradients, descending gradients, corners, transverse gradients, roadway widths, roadway surfaces or the like to be taken into consideration as route data. The route data may be provided, for example, from a navigation system of the transportation vehicle, external data sources, and sensors of the transportation vehicle, for example, a gradient sensor, radar sensor, lidar sensor or the like.

According to the disclosed embodiments, it is, for example, possible for data relating to ambient temperatures, precipitation, snow conditions, ice conditions, wind strength, wind direction or the like to be taken into consideration as weather data. The weather data may be provided, for example, from external data sources and sensors of the transportation vehicle, for example, a temperature sensor, a radar sensor, a lidar sensor or the like.

According to the disclosed embodiments, it is, for example, possible for data relating to traffic density, traffic flow, accidents or the like to be taken into consideration as traffic data. The traffic data may be provided, for example, from external data sources and sensors of the transportation vehicle, for example, a radar sensor, a lidar sensor or the like. The driver profile is, for example, stored in a memory device of the transportation vehicle. The driver profile optionally includes driver-specific data, for example, the age of the driver and/or a driving style of the driver and/or a fitness of the driver to drive and/or a driving ability of the driver or the like.

All of these data are associated with the braking behavior of the transportation vehicle. In this way, the emergency brake device may be configured according to the situation, such that a stronger emergency braking action may be implemented, for example, in the case of a sporty driver than in the case of a more cautious or anxious driver. It is thus possible, for example, for a stronger emergency braking action to be configured before a corner or in the presence of a steep descending gradient than on a straight road section or in the presence of a relatively steep descending gradient.

For example, an emergency braking operation may thus be designed to be stronger if a distance to a vehicle traveling ahead is relatively small in relation to a distance to a vehicle traveling behind than if a distance to a transportation vehicle traveling behind is relatively small, to prevent a rear-end collision. This has the benefit that the operational reliability of the brake system is further improved using simple methods or mechanisms and in an inexpensive way.

It is furthermore suggested that the configuration device has a self-locking spindle mechanism for the purposes of configuring the energy store. The self-locking spindle mechanism may be designed as a ball spindle mechanism. The self-locking spindle mechanism may be designed to adjust and maintain a preload of the energy store that is designed as a spring device. Alternatively, the self-locking spindle mechanism may be designed to adjust and maintain a volume of an energy store that is designed as a pressure device. This has the benefit that easy configurability of the energy store is ensured using simple methods or mechanisms and in an inexpensive way.

In a disclosed embodiment, the energy store is designed to directly actuate the brake device and/or to actuate an actuator device for the purposes of actuating the brake device and/or to actuate an emergency actuator device for the purposes of actuating the brake device. Direct actuation may be implemented, for example, by virtue of the energy store being designed to subject the brake device to a pressure force, by which a braking torque can be generated. An actuation of the actuator device may, for example, be implemented such that the energy store provides a pressure medium, for example, a hydraulic fluid, that can be introduced into the actuator device for the purposes of actuating the brake device. In the context of the disclosure, an emergency actuator device is an additional actuator device that can be operated for the purposes of actuating the brake device by the energy store. This has the benefit that the operational reliability of the brake system is further improved using simple methods or mechanisms and in an inexpensive way.

The triggering device optionally has an electromagnet for holding the triggering device in a basic position. The triggering device moreover optionally has a spring device that has a preload in the basic position. If the on-board electrical system fails, the electrical energization of the electromagnet also fails, such that the triggering device can be moved out of the basic position by the spring force, and the emergency braking operation can thus be initiated. This has the benefit that the operational reliability of the brake system is further improved using simple methods or mechanisms and in an inexpensive way.

In at least one exemplary embodiment, the triggering device has a voltage monitoring device for monitoring the on-board electrical system, an electric actuating motor for releasing the energy store for the purposes of actuating the brake device, and an electrical storage battery for storing an emergency operating current for operating the actuating motor, the triggering device being designed to operate the actuating motor with the emergency operating current in the event of a failure of the on-board electrical system. The triggering device may be designed such that the actuating motor is electrically deenergized when the on-board electrical system is functional. The actuating motor optionally exhibits a self-locking action which is such that the actuating motor maintains its present position when electrically deenergized.

A failure of the on-board electrical system can be detected by the voltage monitoring device. The voltage monitoring device is designed to in this case activate the electrical switch to operate the actuating motor. By using the actuating motor, the stored energy in the energy store, for example, spring energy or hydrostatic energy, can be released for the purposes of operating the brake device. This has the benefit that the operational reliability of the brake system is further improved using simple methods or mechanisms and in an inexpensive way.

The emergency brake device may have a restoring device for restoring the triggering device into a basic position. By using the restoring device, the triggering device can be restored into the basic position after an emergency braking operation and when the on-board electrical system is available again. The restoring device may be designed as part of the triggering device. In the basic position, a release of the stored energy in the energy store for the purposes of actuating the brake device may be prevented by the triggering device. Furthermore, the brake system may be designed to fill the energy store again such that, in the event of another failure of the on-board electrical system, another emergency braking operation can be performed using the emergency brake device. The configuration device may be designed for this purpose. Alternatively or in addition, the triggering device may also be designed for this purpose. This has the benefit that the operational reliability of the brake system is further improved using simple methods or mechanisms and in an inexpensive way.

According to a second exemplary embodiment, this is achieved by a method for operating a disclosed brake system. The method comprises:

holding the triggering device in the basic position if an on-board electrical system is providing sufficient electrical current to actuate the actuator device, using a determining device of the transportation vehicle to determine vehicle parameters and environmental parameters that have an influence on a braking input for reliably braking the transportation vehicle, using the configuration device to configure the actuation, providable using the emergency brake device, of the brake device, using the triggering device to release the stored energy in the energy store if the on-board electrical system is no longer providing sufficient electrical current to actuate the actuator device, and using the energy released from the energy store to actuate the brake device.

The brake system is initially in a normal state. The on-board electrical system is functional, such that sufficient electrical energy to operate the control device and the actuator device is being provided. In this state, a braking input can be implemented without problems by the brake device. Parameters that are relevant to the emergency brake device with regard to braking are determined by the determining device. The emergency brake device is configured on the basis of these determined parameters. This configuration may relate, for example, to a loading of the energy store and/or to a rate of release of energy of the energy store in the emergency braking situation. This configuration may be performed such that a reliable emergency braking operation is possible by the emergency brake device at all times while the transportation vehicle is traveling. In the event of a failure of the on-board electrical system, when normal operation of the brake system is no longer ensured, the triggering device automatically initiates the emergency braking operation by releasing the stored energy in the energy store to the brake device. The wheel is hereby braked.

All of the benefits that have already been described with regard to a brake system according to the first exemplary embodiment are obtained with the disclosed method. Accordingly, the disclosed method has the benefit over conventional methods that reliable stoppage of the traveling transportation vehicle in the event of a failure of the on-board electrical system is ensured using simple methods or mechanisms and in an inexpensive way by the emergency brake device. This is achieved by way of the interaction of the energy store with the triggering device. The triggering device releases the energy store automatically, and without the need for a supply of electrical energy from the on-board electrical system, in the event of failure of the on-board electrical system. The energy store provides the brake device with the energy that is required for braking the transportation vehicle. A reliable emergency braking operation is thus possible.

According to a third exemplary embodiment, this is achieved by a transportation vehicle. The transportation vehicle comprises a drive system for the drive of the transportation vehicle and comprises a brake system for the braking of the transportation vehicle. The disclosed brake system is designed as a brake system according to the disclosure. The transportation vehicle may have multiple sensors that are designed to detect braking-relevant data for the brake system.

All of the benefits that have already been described with regard to a brake system according to the first exemplary embodiment and with regard to a disclosed method according to the second exemplary embodiment are obtained with the disclosed transportation vehicle. Accordingly, the disclosed transportation vehicle has the benefit over conventional transportation vehicles that reliable stoppage of the traveling transportation vehicle in the event of a failure of the on-board electrical system is ensured using simple methods or mechanisms and in an inexpensive way by the emergency brake device. This is achieved by way of the interaction of the energy store with the triggering device. The triggering device is designed to release the energy store automatically, and without the need for a supply of electrical energy from the on-board electrical system, in the event of failure of the on-board electrical system. The energy store provides the brake device with the energy that is required for braking the transportation vehicle. The operational reliability of the disclosed transportation vehicle is thus greatly increased in relation to conventional transportation vehicles.

Elements of identical function and mode of operation denoted are in each case by the same reference designations in FIGS. 1 to 5.

Figure 5:
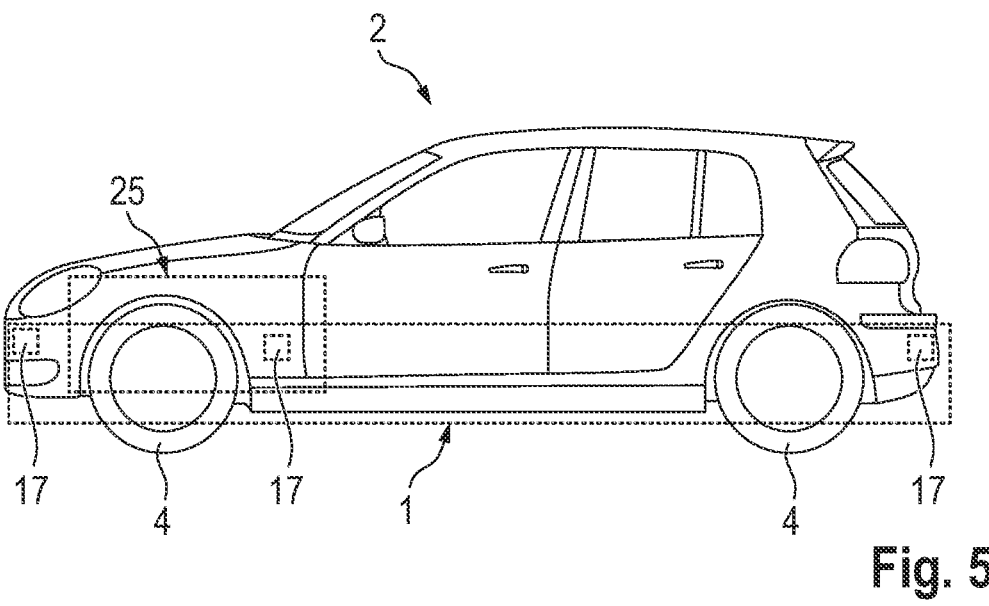
FIG. 5 is a side view of an exemplary embodiment of a disclosed transportation vehicle.

FIG. 1 shows, in a schematic diagram, the first exemplary embodiment of a brake system 1 for a transportation vehicle 2 (cf. FIG. 5). To brake multiple wheels 4 (not shown in this illustration, cf. FIG. 5), the brake system 1 has in each case one brake device 3 and one hydraulic actuator device 5 for actuating the brake device 3. To generate an operating pressure for operating the brake device 3, the actuator device 5 has a primary pressure device 18 and a secondary pressure device 19. To operate the actuator device 5, the brake system 1 has a control device 6.

Furthermore, the brake system 1 has an emergency brake device 7 for performing an emergency braking operation. The emergency brake device 7 has an energy store 8 and a triggering device 9 for releasing the stored energy in the energy store 8 for the purposes of operating the brake device 3. The energy store 8 has a pressure cylinder 20 in which a pressure piston 21 is held in displaceable way. A compression spring 22 is arranged on the pressure piston 21. Alternatively or in addition, it is also possible for a tension spring to be arranged on the pressure piston 21, the spring force of which optionally acts in the same direction as the spring force of the compression spring 22. The pressure piston 21 is illustrated in a basic position, in which the compression spring 22 has a preload. The pressure piston 21 is held in the basic position by the triggering device 9. For this purpose, the triggering device 9 has an electromagnet 12. If an electrical supply fails, the electromagnet 12 becomes inactive, such that the triggering device 9 automatically releases the pressure piston 21. By using the preloaded compression spring 22, the pressure piston 21 can be pushed into the pressure cylinder 20 proceeding from the basic position. In this way, hydraulic fluid can be forced out of the pressure cylinder 20 to the actuator device 5 for the purposes of actuating the brake device 3. To maintain a pressure level in the event of failure of the on-board electrical system, the actuator device 5 has two protection valves 24, which are open during normal operation and which are closed in the electrically deenergized state, in particular, in the event of failure of the on-board electrical system. A fluid flow from the emergency brake device 7 in the direction of the primary pressure device 18 and of the secondary pressure device 19 can thus be prevented.

The emergency brake device 7 furthermore has a configuration device 10, which is implemented partly by the triggering device 9 and partly by an emergency valve 23. By using the triggering device 9 of the configuration device 10, a position of the pressure piston 21 relative to the pressure cylinder 20 can be varied in targeted way, and the preload of the compression spring 22 can thus be correspondingly increased or decreased. The emergency valve 23 of the configuration device is designed for limiting, in targeted, optionally continuously variable way, a hydraulic fluid flow from the energy store 8 to the actuator device 5. The emergency valve 23 may be adjustable by the control device 6, and optionally exhibits a self-locking action, such that a valve position of the emergency valve 23 is maintained in the absence of activation of the emergency valve 23.

Figure 2:
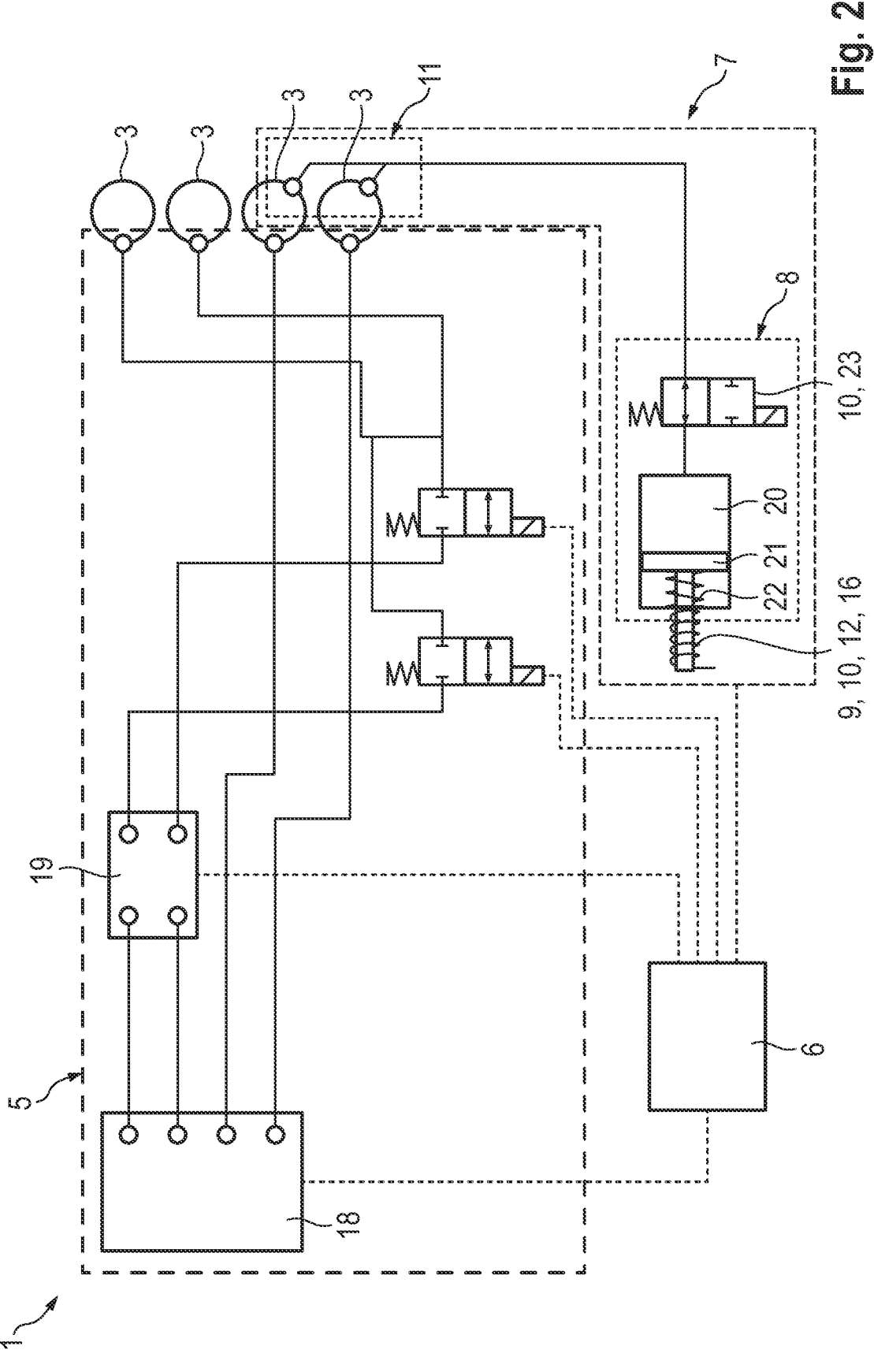
FIG. 2 is a schematic diagram of a second exemplary embodiment of a disclosed brake system.

FIG. 2 shows the second exemplary embodiment of a brake system 1 in a schematic diagram. The brake system 1 according to the second exemplary embodiment differs from the brake system 1 according to the first exemplary embodiment with regard to a design of the emergency brake device 7. The emergency brake device 7 is no longer fluidically coupled to the actuator device 5 and, instead, for the purposes of actuating the brake device 3, has an emergency actuator device 11 that is fluidically coupled via the emergency valve 23 to the energy store 8. The rest of the functioning of the emergency brake device 11 corresponds to the first exemplary embodiment.

Figure 3:
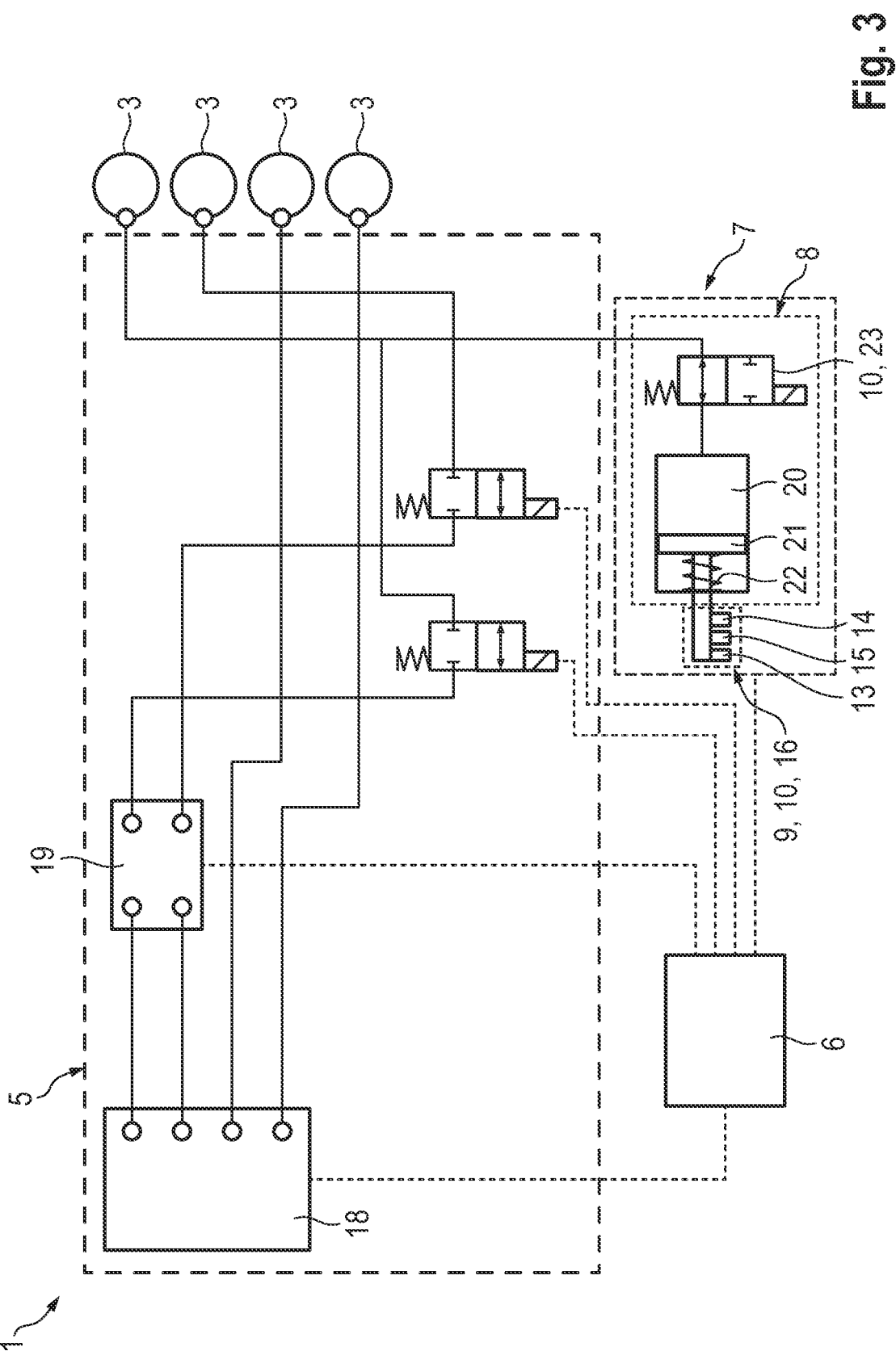
FIG. 3 is a schematic diagram of a third exemplary embodiment of a disclosed brake system.

FIG. 3 shows, in a schematic diagram, the third exemplary embodiment of a brake system 1. The brake system 1 according to the third exemplary embodiment differs from the brake system 1 according to the first exemplary embodiment with regard to a design of the triggering device 9 of the emergency brake device 7. The triggering device 9 is again designed as part of the configuration device 10. Instead of an electromagnet 12, the triggering device 9 now has a voltage monitoring device 13, an actuating motor 14 and an electrical storage battery 15. If a failure of the on-board electrical system is detected by the voltage monitoring device 13, the stored electrical energy in the electrical storage battery 15 can be released, for the purposes of operating the actuating motor 14, by the voltage monitoring device 13. The pressure piston 21 can be released by operation of the actuating motor 14. The rest of the functioning of the emergency brake device 11 corresponds to the first exemplary embodiment.

Figure 4:
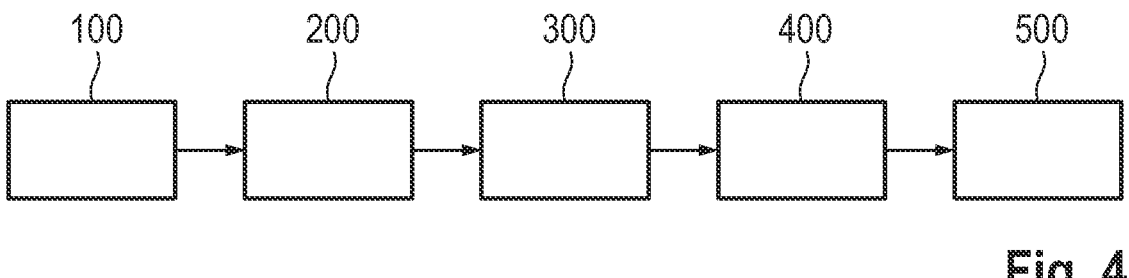
FIG. 4 is a flow diagram of an exemplary embodiment of a disclosed method.

FIG. 4 schematically shows the exemplary embodiment of a disclosed method in a flow diagram. In a first method action 100, the transportation vehicle 2 is operated in a normal driving mode. Here, the triggering device 9 is held in the basic position, for example, by the electromagnet 12, actuating motor 14 or the like. The electrical energy required for this purpose is, for example, provided by the on-board electrical system of the transportation vehicle 2. In a second method action 200, while the transportation vehicle 2 is traveling, vehicle parameters and environmental parameters that have an influence on a braking input for reliably braking the transportation vehicle 2 are determined by a determining device 17 (cf. FIG. 5) of the transportation vehicle 2. Such parameters include, for example, route data, weather data, traffic data, the vehicle speed, data of a driver profile of a driver of the transportation vehicle 2, a present total weight of the transportation vehicle 2, a tire state of the tires of the transportation vehicle 2, or the like. The determination may be performed continuously.

In a third method action 300, the actuation, providable using the emergency brake device 7, of the brake device 3 is configured by the configuration device 10. This is performed, for example, by movement of the pressure piston 21 in the pressure cylinder 20, for example, by the electromagnet 12, the actuating motor 14 or the like, whereby the preload force of the compression spring 22 is varied. Alternatively or in addition, this is performed, for example, by variation of a valve position of the emergency valve 23. A fourth method action 400 is performed if the on-board electrical system malfunctions and is not providing electrical current, or is at least no longer providing sufficient electrical current, to operate the brake system 1. In this situation, the triggering device 9 automatically releases the energy store 8. This may be performed, for example, by virtue of the pressure piston 21 being released, which then, owing to the preload force of the compression spring 22, plunges further into the pressure cylinder 20 and thus displaces the hydraulic fluid. In a fifth method action 500, the brake device 3 is actuated by the displaced hydraulic fluid, and the transportation vehicle 2 is brought to a standstill, and braked in a sustained way, particularly well suited to the situation.

FIG. 5 schematically shows at least one exemplary embodiment of a disclosed transportation vehicle 2 in a side view. The transportation vehicle 2 has a drive system 25 for driving wheels 4 of the transportation vehicle 2. The transportation vehicle 2 furthermore has a brake system 1 for braking the wheels 4. The brake system 1 has multiple determining devices 17, for example, a radar, a lidar, a rain sensor, a navigation system, a traffic information system or the like, for the purposes of determining braking-relevant data.

LIST OF REFERENCE DESIGNATIONS

1 Brake system
2 Transportation vehicle
3 Brake device
4 Wheel
5 Actuator device
6 Control device
7 Emergency brake device
8 Energy store
9 Triggering device
10 Configuration device
11 Emergency actuator device
12 Electromagnet
13 Voltage monitoring device
14 Actuating motor
15 Electrical storage battery
16 Restoring device
17 Determining device
18 Primary pressure device
19 Secondary pressure device
20 Pressure cylinder
21 Pressure piston
22 Compression spring
23 Emergency valve
24 Protection valve
25 Drive system
100 First method action
200 Second method action
300 Third method action
400 Fourth method action
500 Fifth method action

The invention claimed is:

1. A brake system for a transportation vehicle, the brake system comprising:
   a wheel brake device for braking a wheel of the transportation vehicle;
   an actuator device for targetedly actuating the wheel brake device;
   a control device for controlling the actuator device; and
   an emergency brake device for braking the wheel in response to a malfunction of the transportation vehicle, wherein the transportation vehicle malfunction is a malfunction of an on-board electrical system that renders the on-board electrical system unable to provide an amount of electrical current required to actuate the actuator device of the brake system,
   wherein the emergency brake device has an energy store for storing electrical energy for actuating the wheel brake device, a triggering device for releasing the stored electrical energy in the energy store to actuate the wheel brake device, and a configuration device for targetedly configuring the actuation using the emergency brake device of the wheel brake device, wherein the triggering device releases the energy store in response to the failure of the on-board electrical system of the transportation vehicle, and
   wherein the configuration device is configured to set the maximum electrical energy delivered by the energy store and/or to set a delivery rate of the electrical energy delivered by the energy store.

2. The brake system of claim 1, wherein the configuration device performs the configuration of the actuation based on:
   route data; and/or
   weather data; and/or
   traffic data; and/or
   the vehicle speed; and/or
   a driver profile of a driver of the transportation vehicle; and/or
   a total weight of the transportation vehicle; and/or
   a tire state of the transportation vehicle.

3. The brake system of claim 1, wherein the configuration device has a self-locking spindle mechanism for configuring the energy store.

4. The brake system of claim 1, wherein the energy store directly actuates the wheel brake device and/or actuates the actuator device to actuate the wheel brake device and/or to actuate an emergency actuator device of the emergency brake device to actuate the wheel brake device.

5. The brake system of claim 1, wherein the triggering device has an electromagnet for holding the triggering device in a basic position.

6. The brake system of claim 1, wherein the triggering device includes a voltage monitoring device for monitoring the on-board electrical system, an electric actuating motor for releasing the energy store to actuate the wheel brake device, and an electrical storage battery for storing an emergency operating current for operating the actuating motor, wherein the triggering device operates the actuating motor with the emergency operating current in response to a failure of the on-board electrical system.

7. The brake system of claim 1, wherein the emergency brake device has a restoring device for restoring the triggering device into a basic position.

8. A transportation vehicle comprising a drive system for the drive of the transportation vehicle and comprising a brake system for the braking of the transportation vehicle, wherein the brake system is the brake system of claim 1.

9. A method for operating a brake system that includes a wheel brake device for braking a wheel of the transportation vehicle, an actuator device for targetedly actuating the wheel brake device, a control device for controlling the actuator device, and an emergency brake device for braking the wheel in response to a malfunction of the transportation vehicle wherein an on-board electrical system is rendered unable to provide an amount of electrical current required to actuate the actuator device of the brake system, the method comprising:
   holding a triggering device in a basic position in response to an on-board electrical system providing electrical current required to actuate the actuator device;
   using a determining device of the transportation vehicle to determine vehicle parameters and environmental parameters that have an influence on a braking input for reliably braking the transportation vehicle;
   using a configuration device to configure the actuation, providable using the emergency brake device, of the wheel brake device;
   using the triggering device to release the stored electrical energy in an energy store in response to the vehicle malfunction, wherein the on-board electrical system is no longer able to provide the electrical current required to actuate the actuator device; and using the electrical energy released from the energy store to actuate the wheel brake device, wherein the configuration device is configured to set the maximum electrical energy delivered by the energy store and/or to set a delivery rate of the electrical energy delivered by the energy store.

10. The method of claim 9, wherein the targeted actuation uses the emergency brake device of the wheel brake device.

11. The method of claim 9, wherein the configuration device performs the configuration of the actuation based on:

route data; and/or weather data; and/or traffic data; and/or the vehicle speed; and/or a driver profile of a driver of the transportation vehicle; and/or a total weight of the transportation vehicle; and/or a tire state of the transportation vehicle.

12. The method of claim 11, wherein the configuration device has a self-locking spindle mechanism for configuring the energy store.

13. The method of claim 9, wherein the energy store directly actuates the wheel brake device and/or actuates the actuator device to actuate the brake device and/or to actuate an emergency actuator device of the emergency brake device to actuate the wheel brake device.

14. The method of claim 9, wherein the triggering device has an electromagnet for holding the triggering device in a basic position.

15. The method of claim 9, wherein the triggering device includes a voltage monitoring device for monitoring the on-board electrical system, an electric actuating motor for releasing the energy store to actuate the wheel brake device, and an electrical storage battery for storing an emergency operating current for operating the actuating motor, wherein the triggering device operates the actuating motor with the emergency operating current in response to a failure of the on-board electrical system.

16. The method of claim 9, wherein the emergency brake device has a restoring device for restoring the triggering device into a basic position.

17. The braking system of claim 1, wherein the configuration device is further configured to increase and decrease the electrical energy stored in the energy store.

18. The method of claim 9, wherein the configuration device is further configured to increase and decrease the electrical energy stored in the energy store.

* * * * *